(12) United States Patent
Winarski

(10) Patent No.: US 10,540,514 B1
(45) Date of Patent: Jan. 21, 2020

(54) DISTRIBUTED NETWORK FOR STORING A REDUNDANT ARRAY OF INDEPENDENT BLOCKCHAIN BLOCKS

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 0 days.

(21) Appl. No.: 16/529,684

(22) Filed: Aug. 1, 2019

Related U.S. Application Data

(63) Continuation of application No. 16/027,226, filed on Jul. 3, 2018.

(51) Int. Cl.
*H04L 29/06* (2006.01)
*G06F 21/62* (2013.01)

(52) U.S. Cl.
CPC ...... *G06F 21/6227* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 8,627,181 | B1 * | 1/2014 | Ito | G06F 11/108 714/773 |
| 9,569,771 | B2 * | 2/2017 | Lesavich | G06F 21/6245 |
| 10,243,748 | B1 * | 3/2019 | Callan | H04L 9/3239 |
| 2002/0138559 | A1 * | 9/2002 | Ulrich | G06F 16/10 709/203 |
| 2002/0156891 | A1 * | 10/2002 | Ulrich | G06F 9/5083 709/225 |
| 2005/0273651 | A1 * | 12/2005 | Subbarao | G06F 11/1076 714/6.12 |
| 2009/0216832 | A1 * | 8/2009 | Quinn | G06F 11/1076 709/203 |
| 2016/0188410 | A1 * | 6/2016 | Lee | G06F 11/1044 714/6.24 |

(Continued)

FOREIGN PATENT DOCUMENTS

WO 2018170462 A1 9/2018

OTHER PUBLICATIONS

Doriane Perard, Jerome Lacan, Yann Bachy and Jonathan Detchart, Erasure code-based low storage blockchain node, arXiv:1805.00860v1 [cs.CR] May 2, 2018, https://arxiv.org/pdf/1805.00860.pdf.

*Primary Examiner* — Shin-Hon (Eric) Chen
(74) *Attorney, Agent, or Firm* — The Winarski Firm, PLLC

(57) ABSTRACT

The present invention discloses a system for storing a blockchain on a distributed network. The system includes a distributed network containing a plurality of nodes. The system stripes a blockchain into individual blocks where each individual block is separately encrypted and stored on a different node of the distributed network. The system forms a parity block from the individual blocks striped from the single blockchain. The parity block is separately encrypted and stored on a node of the distributed network separate from the other nodes storing the individual blocks for the blockchain. The system uses a blockchain distributed network map identifying where all of the individual blocks and the parity block are stored on the distributed network to reassemble all of the individual blocks into an undivided single blockchain.

19 Claims, 11 Drawing Sheets

(56) References Cited

U.S. PATENT DOCUMENTS

| | | | |
|---|---|---|---|
| 2016/0364181 A1* | 12/2016 | McGlaughlin | G06F 11/1012 |
| 2018/0241565 A1* | 8/2018 | Paolini-Subramanya | ............... |
| | | | H04L 9/3239 |
| 2019/0149321 A1* | 5/2019 | Androulaki | H04L 9/3239 |
| | | | 380/28 |

* cited by examiner

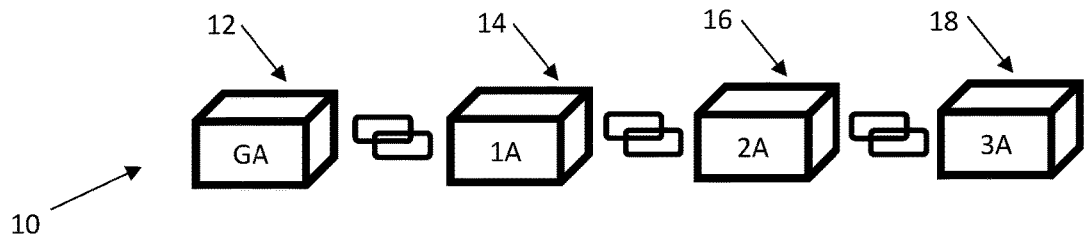

| GENESIS BLOCK 12 | INFORMATION IN BLOCK:<br>*HASH OF CURRENT BLOCK<br>*DATA |
|---|---|
| FIRST BLOCK 14 | INFORMATION IN BLOCK:<br>*HASH OF PREVIOUS BLOCK (GENESIS) AND HASH OF CURRENT BLOCK<br>*DATA |
| SECOND BLOCK 16 | INFORMATION IN BLOCK:<br>*HASH OF PREVIOUS BLOCK (FIRST BLOCK) AND HASH OF CURRENT BLOCK<br>*DATA |
| THIRD BLOCK 18 | INFORMATION IN BLOCK:<br>*HASH OF PREVIOUS BLOCK (SECOND BLOCK) AND HASH OF CURRENT BLOCK<br>*DATA |

DISTRIBUTED NETWORK FOR STORING A REDUNDANT ARRAY OF INDEPENDENT BLOCKCHAIN BLOCKS

BACKGROUND

A blockchain is a continuously growing list of records, called blocks, which are linked and secured using cryptography. Each block typically contains a cryptographic hash of the previous block, a timestamp, and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

Blockchains are secure by design and are an example of a distributed computing system with high Byzantine fault tolerance. Decentralized consensus has therefore, been achieved with a blockchain. This makes blockchains potentially suitable for the recording of events, medical records, and other records management activities, such as identity management, transaction processing, documenting provenance, food traceability, or voting.

The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block. In 2002, David Mazières and Dennis Shasha proposed a network file system with decentralized trust: writers to the file system trust one another but not the network in between; they achieve file system integrity by writing signed commits to a shared, append-only signature chain that captures the root of the file system (which in turn is a Merkle Tree). This system can be viewed as a proto-blockchain in which all authorized clients can always write, whereas, in modern blockchains, a client who solves a cryptographic puzzle can write one block. In 2005, Nick Szabo proposed a blockchain-like system for decentralized property titles and his "bit-gold" payment system that utilized chained proof-of-work and timestamping. However, Szabo's method of double-spending protection was vulnerable to Sybil attacks.

Blockchain was conceptualized in 2008 by Satoshi Nakamoto and implemented in 2009 as a core component of Bitcoin's public transaction ledger. The invention of the blockchain for Bitcoin made it the first digital currency to solve the double spending problem without the need of a trusted authority or central server. The bitcoin design has been the inspiration for other applications. Current implementations of bitcoin have a variety of drawbacks limiting its desirability and usefulness. Bitcoin blockchains are currently vulnerable to theft due to their manner of storage on single nodes. Further, bitcoins blockchains are not encrypted allowing anyone to see the transaction history.

SUMMARY

The present invention discloses a distributed network for storing a redundant array of independent blockchain blocks. The distributed network contains a plurality of nodes and a plurality of blockchains divided into individual blocks. Each individual block is separately encrypted and stored on a different node of the distributed network. The distributed network also includes a plurality of first parity blocks. Each first parity block is formed from the individual blocks divided from a single blockchain. The first parity blocks are separately encrypted and stored on a node of the distributed network separate from the other nodes storing the individual blocks for the single blockchain. The distributed network further includes a blockchain distributed network map identifying where all of the individual blocks and the first parity blocks are stored on the distributed network and how to reassemble all of the individual blocks back into an undivided single blockchain. In one embodiment, one node of the distributed network is dedicated to storing all of the first parity blocks. In another embodiment, the first parity blocks are distributed throughout the nodes of the distributed network. In a further embodiment, the distributed network also includes a second parity block in addition to the first parity block. Each second parity block is formed from the individual blocks divided from the single blockchain. The second parity blocks are separately encrypted and stored on a node of the distributed network separate from the other nodes storing the individual blocks for the single blockchain and the first parity block. In another embodiment, each node within the distributed network includes a cryptographic anchor identifying the node with information such as GPS positioning information, network identifying information, and device model/serial number information. In a still further embodiment, the distributed network can also include a cloud-based blockchain appliance accessible by a terminal connected to a node of the distributed network. The cloud-based blockchain appliance has a blockchain generation module configured to generate new blockchains or add new blocks to existing blockchains. The appliance also has a blockchain dividing module configured to divide the single blockchain into the individual blocks. In addition, the appliance also has a parity module configured to calculate the first and second parity blocks from the individual blocks forming the single blockchain. Further, the appliance includes a blockchain encryption module configured to separately encrypt each individual block divided from the single blockchain and the first and second parity blocks. The blockchain encryption module utilizes encryption keys stored in a cloud-cache data store for encrypting each individual block divided from the single blockchain as well as the first and second parity blocks. The blockchain appliance also has a node distribution module that accesses distributed network node information from the cloud-cache data store, wherein the node distribution module determines which nodes of the distributed network are to store the encrypted individual blocks from the single blockchain and the first and second parity blocks. The node distribution module generates the blockchain distributed network map to record where each encrypted individual block is stored on the distributed network as well as which node stores the first and second parity blocks. The blockchain appliance additionally has a distributed network communications module. The node distribution module transmits the encrypted individual blocks and the first and second parity blocks to the specific nodes of the distributed network according to the blockchain distributed network map through the distributed network communication module. The blockchain appliance also has a blockchain reconstruction module. The blockchain reconstruction module gathers the encrypted individual blocks from the nodes of the distributed network using the blockchain distributed network map. The blockchain reconstruction module uses the blockchain encryption module to decrypt the encrypted individual blocks and reconstructs the single blockchain from them using the blockchain distributed network map. The blockchain reconstruction module may also use the first and second parity blocks to reconstruct the single blockchain in the event any individual block is corrupted or missing.

The present invention discloses a system for storing a blockchain on a distributed network that contains a plurality of nodes. The system stipes a blockchain into individual blocks. Each individual block is separately encrypted and stored on a different node of the distributed network. A parity block is formed from the individual blocks striped from the blockchain. The parity block is separately encrypted and stored on a node of the distributed network separate from the other nodes storing the individual blocks for the blockchain. A blockchain distributed network map identifies where all of the individual blocks and the parity block are stored on the distributed network and how to reassemble all of the individual blocks back into a single blockchain. This system also has a cloud-based blockchain appliance accessible by a terminal connected to a node of the distributed network. The cloud-based blockchain appliance has a blockchain generation module configured to create the blockchain or add new blocks to the blockchain. In addition, the cloud-based blockchain appliance has a blockchain striping module configured to stripe the blockchain into the individual blocks. Further, the appliance includes a parity module configured to calculate the parity block from the individual blocks forming the blockchain. The blockchain appliance also has a blockchain encryption module configured to separately encrypt each individual block striped from the blockchain and the parity block. The blockchain encryption module utilizes encryption keys stored in a cloud-cache data store for encrypting each individual block striped from the blockchain as well as the parity block. The blockchain appliance also has a node distribution module that accesses distributed network node information from the cloud-cache data store. The node distribution module determines which nodes of the distributed network are to store the encrypted individual blocks from the blockchain and the parity block. The node distribution module generates the blockchain distributed network map to record where each encrypted individual block is stored on the distributed network as well as which node stores the parity block. The blockchain appliance additionally has a distributed network communications module. The node distribution module transmits the encrypted individual blocks and the parity block to the specific nodes of the distributed network according to the blockchain distributed network map through the distributed network communication module. The blockchain appliance also has a blockchain reconstruction module that gathers the encrypted individual blocks and parity blocks from the nodes of the distributed network using the blockchain distributed network map and the distributed network communications module. The blockchain reconstruction module uses the blockchain encryption module to decrypt the encrypted individual blocks and parity block and reconstructs the blockchain from them. The blockchain reconstruction module may also use the parity block to reconstruct the single blockchain in the event any individual block is corrupted or missing.

The present invention discloses a blockchain storage appliance. This appliance includes a blockchain striping module configured to stripe a blockchain into individual blocks. The appliance also includes a parity module configured to calculate the parity block from the individual blocks forming the blockchain. In addition, the appliance also has a blockchain encryption module configured to encrypt the individual blocks and the parity block. Further, the appliance has a communications module that stores the encrypted individual blocks and encrypted parity block onto a plurality of nodes on a distributed network according to a blockchain distributed network map that identifies which nodes store which encrypted individual blocks and encrypted parity block. The blockchain distributed network map is stored on a data store in bi-directional communication with the blockchain storage appliance. The blockchain appliance also has a blockchain reconstruction module. The blockchain reconstruction module gathers the encrypted individual blocks and parity blocks from the nodes of the distributed network using the blockchain distributed network map and the distributed network communications module. The blockchain reconstruction module uses the blockchain encryption module to decrypt the encrypted individual blocks and parity block and reconstructs the blockchain from them. The blockchain reconstruction module uses the parity block to reconstruct the single blockchain in the event any individual block is corrupted or missing.

Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof, are best understood through the following description of the preferred embodiment of the present invention when read in conjunction with the accompanying drawings, wherein:

FIG. 11 illustrates a diagram of a blockchain having a genesis block and three succeeding blocks along with tables showing the linking hashes and data associated with each of the blocks in the blockchain.

DETAILED DESCRIPTION

While the invention has been shown and described with reference to a particular embodiment thereof, it will be understood to those skilled in the art that various changes in form and details may be made therein without departing from the spirit and scope of the invention.

Figure 1:
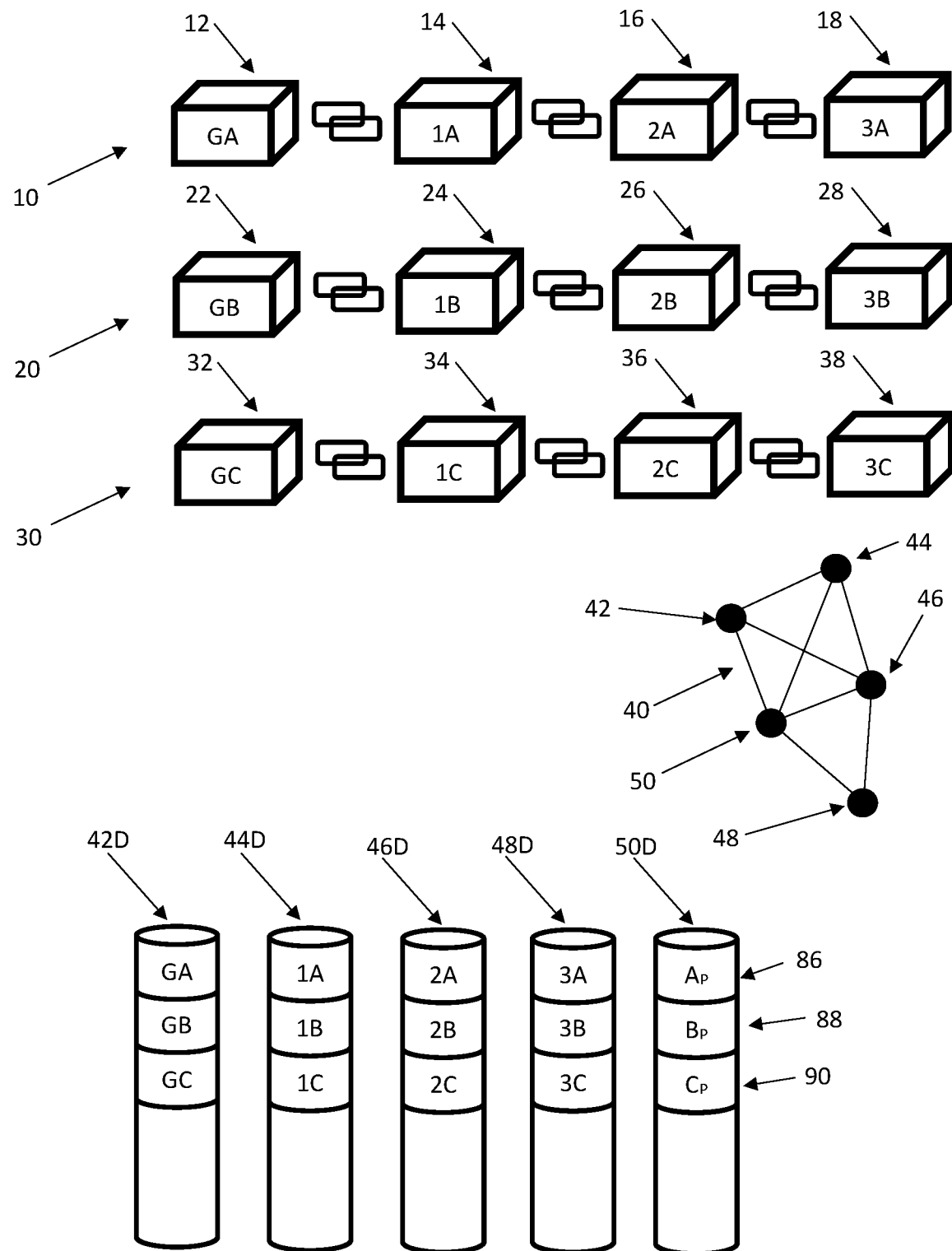
FIG. 1 illustrates a diagram of three exemplary blockchains and how they are stored onto nodes of a distributed network by a Redundant Array of Independent Blockchain Blocks 4 (RAIBB4) protocol dividing the individual blockchains into separate blocks which are each stored on separate nodes using striping along with additional parity blocks for each individual blockchain to provide backup in the event one of the separate blocks is corrupted or missing.

FIG. 1 illustrates a diagram of three exemplary blockchains 10, 20, and 30 and how they are stored onto nodes 42, 44, 46, 48, and 50 of a distributed network 40 by a Redundant Array of Independent Blockchain Blocks 4 (RAIBB4) protocol. The RAIBB4 protocol divides the individual blockchains 10, 20, and 30 into separate blocks (i.e. blockchain 10 is divided into blocks 12, 14, 16, and 18; blockchain 20 is divided into blocks 22, 24, 26, and 28; and blockchain 30 is divided into blocks 32, 34, 36, and 38) which are each stored on separate nodes using striping. A single parity block for each individual blockchain 10, 20, and 30 is created to provide backup and redundancy in the event one of the separate blocks is corrupted or missing while stored on distributed network 40. Under RAIBB4, all parity blocks 86, 88, and 90 are stored on a single dedicated parity storage node. Thus, RAIBB4 has blockchain block striping with a dedicated parity storage node. Blockchain 10 is the A blockchain. Blockchain 10 is formed of a Genesis block 12 for the A blockchain and as such is labelled GA. Blockchain 10 includes three other blocks 14, 16, and 18, each of which are respectively labeled 1A, 2A, and 3A identifying them as the first, second and third blocks in the A blockchain 10. Genesis block 12 includes data. This data can include any conceivable form of data such as text, images, video, code, code updates, spreadsheets, biometric-data, metadata, applications, network communication signals, security data, currency, or any other form of electronic data or software. Genesis block 12 also includes a hash of itself. However, as genesis block 12 is the first block in blockchain 10, it does not have a hash of any prior block as that block does not exist. The next block 14 in blockchain 10 is block 1A, labelled as such as being the first block in the A blockchain 10. Block 14 includes data. This data can include any conceivable form of data such as text, images, video, code, code updates, spreadsheets, biometric-data, metadata, applications, network communication signals, security data, currency, or any other form of electronic data or software. Block 14 also includes a hash of genesis block 12 and a hash of itself, thereby linking blocks 12 and 14 together through this chain of hashes. The next block 16 in the A blockchain 10 is block 2A, labelled as such as being the second block in the A blockchain 10. Block 16 includes data. This data can include any conceivable form of data such as text, images, video, code, code updates, spreadsheets, biometric-data, metadata, applications, network communication signals, security data, currency, or any other form of electronic data or software. Block 16 also includes a hash of first block 14 and a hash of itself, thereby linking blocks 16 and 14 together through this chain of hashes. The next block 18 in the A blockchain 10 is block 3A, labelled as such as being the third block in the A blockchain 10. Block 18 includes data. This data can include any conceivable form of data such as text, images, video, code, code updates, spreadsheets, biometric-data, metadata, applications, network communication signals, security data, currency, or any other form of electronic data or software. Block 18 also includes a hash of second block 16 and a hash of itself, thereby linking blocks 18 and 16 together through this chain of hashes. The use of blockchain technology helps to protect the integrity of data within blockchain 10 from tampering and manipulation. Blockchains 20 and 30 have similar structures to blockchain 10 as discussed above. Blockchain 20 is the B blockchain and has a Genesis block 22 labelled GB, a first block 24 labelled 1B, a second block 26 labelled 2B, and a third block 28 labelled 3B. Block 22 includes data and a hash of itself. Block 24 includes data, a hash of block 22, and a hash of itself. Block 26 includes data, a hash of block 24, and a hash of itself. Block 28 includes data, a hash of block 26, and a hash of itself. Blockchain 30 is the C blockchain and has a Genesis block 32 labelled GC, a first block 34 labelled 1C, a second block 36 labelled 2C, and a third block 38 labelled 3C. Block 32 includes data and a hash of itself. Block 34 includes data, a hash of block 32, and a hash of itself. Block 36 includes data, a hash of block 34, and a hash of itself. Block 38 includes data, a hash of block 36, and a hash of itself.

A distributed network 40 is shown as a collection of black dots that each represent an individual interconnected node 42, 44, 46, 48, and 50 within distributed network 40. The lines interconnecting nodes 42, 44, 46, 48, and 50 are communication lines that form distributed network 40. In this embodiment, each node stores portions of blockchains 10, 20, and 30 based on blockchain striping. In blockchain striping, a blockchain 10 is divided up into its separate constituent blocks 12, 14, 16, and 18 and each block 12, 14, 16, and 18 is stored on a separate node 42, 44, 46, 48, and 50 within distributed network 40. Thus, no single node 42, 44, 46, 48, and 50 within distributed network 40 stores the entire blockchain 10. During operation, one or more blocks 12, 14, 16, and 18 in blockchain 10 may have its data corrupted, damaged or deleted from distributed network 40. To provide redundancy to the storage of blockchain 10 on distributed network 40, a parity block is created from the individual blocks 12, 14, 16, and 18 forming blockchain 10. It is possible to recreate blockchain 10 from less than all individual blocks 12, 14, 16, and 18 when used in combination with the parity block. The blocks of blockchains 10, 20 and 30 are stored on nodes 42, 44, 46, 48, and 50 and shown graphically by cylinders 42D, 44D, 46D, 48D, and 50D. Here, cylinder 42D shows the blockchain blocks stored on node 42. Cylinder 44D shows the blockchain blocks stored on node 44. Cylinder 46D shows the blockchain blocks stored on node 46. Cylinder 48D shows the blockchain blocks stored on node 48. Cylinder 50D shows the blockchain blocks stored on node 50. Based on the RAIBB4 protocol, node 42 stores blockchain blocks 42D which includes GA block 12, GB block 22, and GC block 32. Node 44 stores blockchain blocks 44D which includes 1A block 14, 1B block 24, and 1C block 34. Node 46 stores blockchain blocks 46D which includes 2A block 16, 2B block 26, and 2C block 36. Node 48 stores blockchain blocks 48D which includes 3A block 18, 3B block 28, and 3C block 38. Node 50 stores parity blocks 86, 88, and 90. Parity block 86 labelled $A_P$ is the parity block of the A blockchain 10. The subscript P stands for parity block. Parity block 86 is formed by parity of individual blocks 12, 14, 16, and 18. Parity block 88 labelled $B_P$ is the parity block of the B blockchain 20. The subscript P stands for parity block. Parity block 88 is formed by parity of individual blocks 22, 24, 26, and 28. Parity block 90 labelled $C_P$ is the parity block of the C blockchain 30. The subscript P stands for parity block. Parity block 90 is formed by parity of individual blocks 32, 34, 36, and 38. According to RAIBB4 striping, each node contains the same sequential number of block from each of blockchains 10, 20, and 30 with a separate node dedicated to storing all of the parity blocks 86, 88, and 90. With RAIBB4, the blockchains 10, 20, and 30 are striped evenly into individual blocks (i.e. blockchain 10 is striped into blocks 12, 14, 16, and 18; blockchain 20 is striped into blocks 22, 24, 26, and 28; and blockchain 30 is striped into blocks 32, 34, 36, and 38) that are stored across nodes 42, 44, 46, 48, and 50 on a distributed network with parity information stored in parity blocks 86, 88, and 90.

Figure 2:
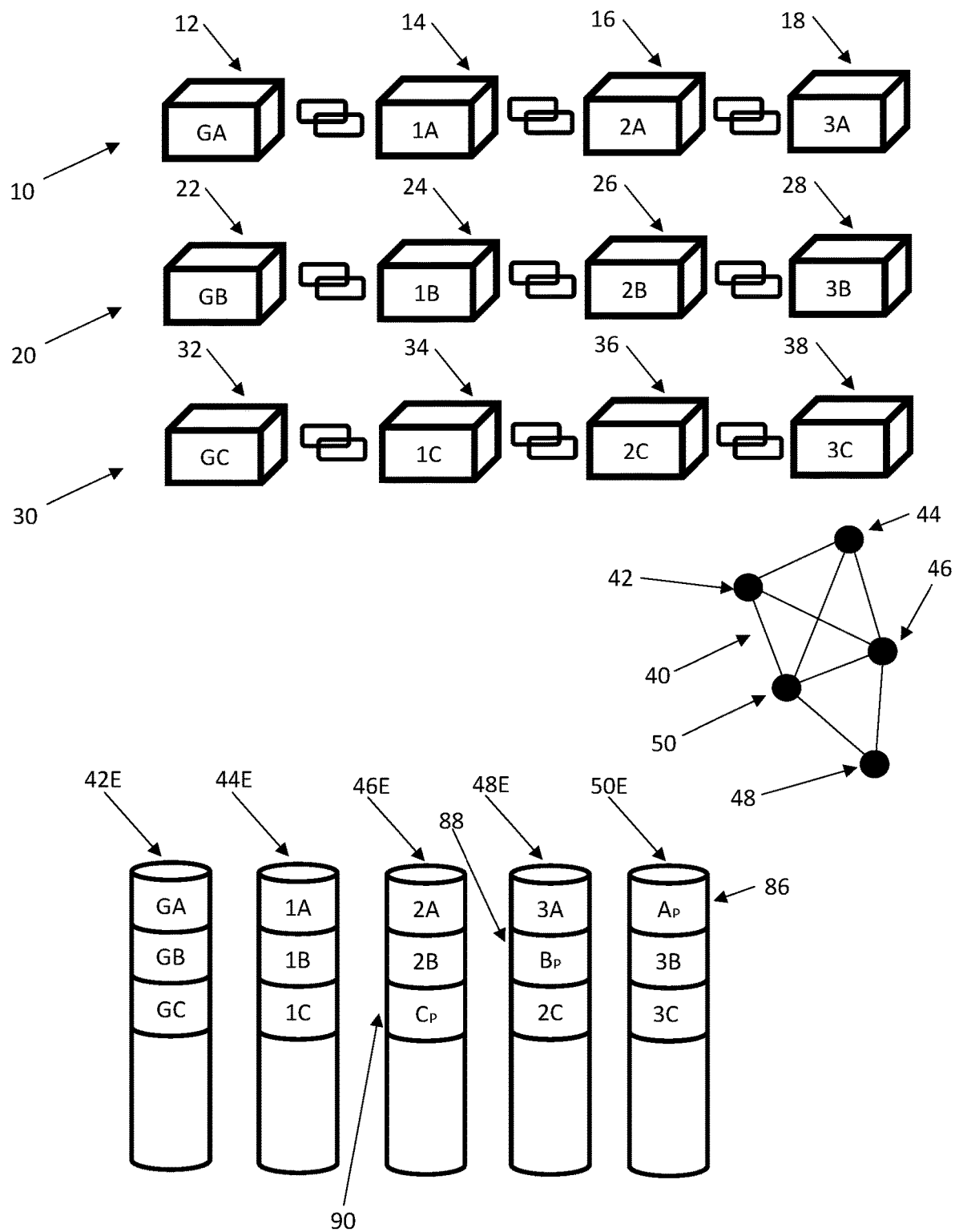
FIG. 2 illustrates a diagram of three exemplary blockchains and how they are stored onto nodes of a distributed network by a Redundant Array of Independent Blockchain Blocks 5 (RAIBB5) protocol by dividing the individual blockchains into separate blocks which are each stored on separate nodes using striping along with additional parity blocks for each individual blockchain to provide backup in the event one of the separate blocks is corrupted or missing.

FIG. 2 illustrates a diagram of three exemplary blockchains and how they are stored onto nodes of a distributed network by a Redundant Array of Independent Blockchain Blocks 5 (RAIBB5) protocol. Under a RAIBB5 protocol, blockchains 10, 20 and 30 are divided into separate individual blocks (i.e. blockchain 10 is divided into blocks 12, 14, 16, and 18; blockchain 20 is divided into blocks 22, 24, 26, and 28; and blockchain 30 is divided into blocks 32, 34, 36, and 38) which are each stored on separate nodes 42, 44, 46, 48, and 50 using striping. Under blockchain striping, blockchains 10, 20 and 30 are broken up into their constituent blocks, each of which are stored on a separate node 42, 44, 46, 48, and 50 in distributed network 40. Like RAIBB4, RAIBB5 includes parity blocks 86, 88, and 90 for each individual blockchain 10, 20, and 30 to provide redundancy and backup in the event one of the separate blocks in the blockchain 10, 20, or 30 is corrupted or missing. However, unlike RAIBB4 where all of the parity blocks 86, 88, and 90 were stored on a single node 50 dedicated for parity blocks only in FIG. 1, under RAIBB5, the parity blocks 86, 88, and 90 and distributed among the various nodes 42, 44, 46, 48, and 50 for storage. Thus, RAIBB5 has blockchain block striping with distributed parity storage. Referring to FIG. 2, the blocks of blockchains 10, 20, and 30 are stored on nodes 42, 44, 46, 48, and 50 and shown graphically by cylinders 42E, 44E, 46E, 48E, and 50E. Here, cylinder 42E shows the blockchain blocks stored on node 42. Cylinder 44E shows the blockchain blocks stored on node 44. Cylinder 46E shows the blockchain blocks stored on node 46. Cylinder 48E shows the blockchain blocks stored on node 48. Cylinder 50E shows the blockchain blocks stored on node 50. Based on the RAIBB5 protocol, node 42 stores blockchain blocks 42E which includes GA block 12, GB block 22, and GC block 32. Node 44 stores blockchain blocks 44E which includes 1A block 14, 1B block 24, and 1C block 34. Node 46 stores blockchain blocks 46E which includes 2A block 16, 2B block 26, and C parity block 90. Node 48 stores blockchain blocks 48E which includes 3A block 18, B parity block 88, and 3C block 38. Node 50 stores blockchain blocks 50E which includes the A parity blocks 86, 3B block 28, and 3C block 38. Parity block 86 labelled $A_P$ is the parity block of the A blockchain 10. The subscript P identifies the block as parity block. Parity block 86 is formed by parity of individual blocks 12, 14, 16, and 18. Parity block 88 labelled $B_P$ is the parity block of the B blockchain 20. The subscript P identifies the block as a parity block. Parity block 88 is formed by parity of individual blocks 22, 24, 26, and 28. Parity block 90 labelled $C_P$ is the parity block of the C blockchain 30. The subscript P identifies the block as a parity block. Parity block 90 is formed by parity of individual blocks 32, 34, 36, and 38. According to RAIBB5 striping, each node contains a different block from blockchains 10, 20, and 30 with parity blocks 86, 88, and 90 distributed across nodes 42, 44, 46, 48, and 50.

In mathematics, parity refers to the evenness or oddness of an integer, which for a binary number is determined only by the least significant bit. In telecommunications and computing, parity refers to the evenness or oddness of the number of bits with value one within a given set of bits and is thus determined by the value of all the bits. It can be calculated via a XOR sum of the bits, yielding 0 for even parity and 1 for odd parity. This property of being dependent upon all the bits and changing value if any one-bit changes allows for its use in error detection schemes. XOR is an Exclusive OR, which is a logical operation that outputs true only when inputs differ (one is true, the other is false). For single parity, the parity P is calculated with the XOR operator $\oplus$ according to equation 1 below (where $D_n$ is the $n^{th}$ block of an n-block blockchain):

$$P = \bigoplus_i D_i = D_0 \oplus D_1 \oplus D_2 \oplus \ldots \oplus D_{n-1} \quad \text{(EQUATION 1)}$$

In FIG. 2, blockchains 10, 20, and 30 have the same structure as discussed with respect to the same blockchains in FIG. 1. Blockchain 10 is formed of a Genesis block 12 for the A blockchain and as such is labelled GA. Blockchain 10 includes three other blocks 14, 16, and 18, each of which are respectively labeled 1A, 2A, and 3A identifying them as the first, second and third blocks in the A blockchain 10. Genesis block 12 includes data. This data can include any conceivable form of data such as text, images, video, code, code updates, spreadsheets, biometric-data, metadata, applications, network communication signals, security data, currency, or any other form of electronic data or software. Genesis block 12 also includes a hash of itself. However, as genesis block 12 is the first block in blockchain 10, it does not have a hash of any prior block as that block does not exist. The next block 14 in blockchain 10 is block 1A, labelled as such as being the first block in the A blockchain 10. Block 14 includes data. This data can include any conceivable form of data such as text, images, video, code, code updates, spreadsheets, biometric-data, metadata, applications, network communication signals, security data, currency, or any other form of electronic data or software. Block 14 also includes a hash of genesis block 12 and a hash of itself, thereby linking blocks 12 and 14 together through this chain of hashes. The next block 16 in the A blockchain 10 is block 2A, labelled as such as being the second block in the A blockchain 10. Block 16 includes data. This data can include any conceivable form of data such as text, images, video, code, code updates, spreadsheets, biometric-data, metadata, applications, network communication signals, security data, currency, or any other form of electronic data or software. Block 16 also includes a hash of first block 14 and a hash of itself, thereby linking blocks 16 and 14 together through this chain of hashes. The next block 18 in the A blockchain 10 is block 3A, labelled as such as being the third block in the A blockchain 10. Block 18 includes data. This data can include any conceivable form of data such as text, images, video, code, code updates, spreadsheets, biometric-data, metadata, applications, network communication signals, security data, currency, or any other form of electronic data or software. Block 18 also includes a hash of second block 16 and a hash of itself, thereby linking blocks 18 and 16 together through this chain of hashes. The use of blockchain technology helps to protect the integrity of data within blockchain 10 from tampering and manipulation. Blockchains 20 and 30 have similar structures to blockchain 10 as discussed above. Blockchain 20 is the B blockchain and has a Genesis block 22 labelled GB, a first block 24 labelled 1B, a second block 26 labelled 2B, and a third block 28 labelled 3B. Block 22 includes data and a hash of itself. Block 24 includes data, a hash of block 22, and a hash of itself. Block 26 includes data, a hash of block 24, and a hash of itself. Block 28 includes data, a hash of block 26, and a hash of itself. Blockchain 30 is the C blockchain and has a Genesis block 32 labelled GC, a first block 34 labelled 1C, a second block 36 labelled 2C, and a third block 38 labelled 3C. Block 32 includes data and a hash of itself. Block 34 includes data, a hash of block 32, and a hash of itself. Block 36 includes data, a hash of block 34, and a hash of itself. Block 38 includes data, a hash of block 36, and a hash of itself. With RAIBB5, the blockchains 10, 20, and 30 are striped evenly into individual blocks (i.e. blockchain 10 is striped into blocks 12, 14, 16, and 18; blockchain 20 is striped into blocks 22, 24, 26, and 28; and blockchain 30 is striped into blocks 32, 34, 36, and 38) that are stored across nodes 42, 44, 46, 48, and 50 on a distributed network with parity information stored in parity blocks 86, 88, and 90.

Figure 3:
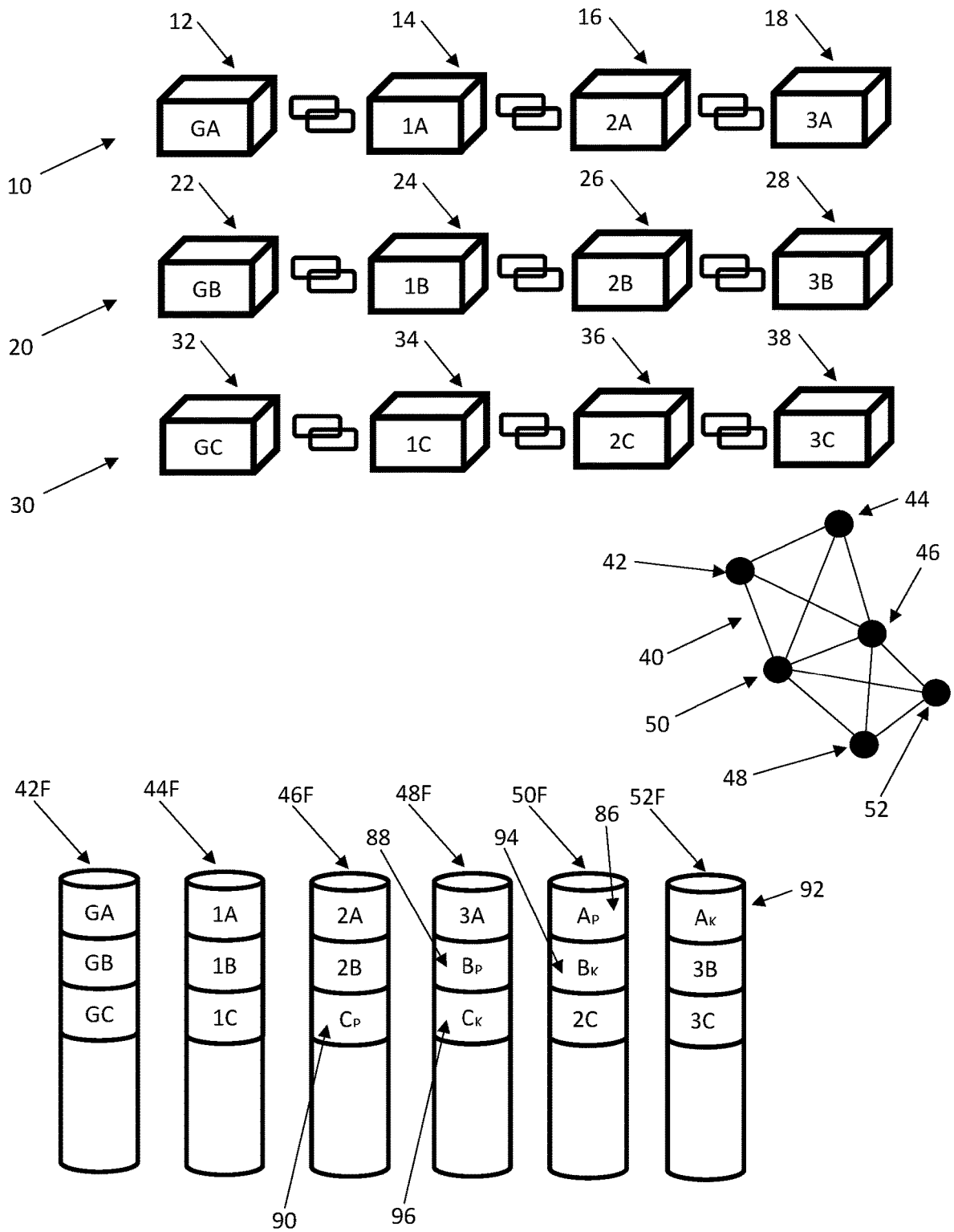
FIG. 3 illustrates a diagram of three exemplary blockchains and how they are stored onto nodes of a distributed network by a Redundant Array of Independent Blockchain Blocks 6 (RAIBB6) protocol by dividing the individual blockchains into separate blocks which are each stored on separate nodes using striping along with two additional parity blocks to provide backup in the event one of the separate blocks is corrupted or missing.

FIG. 3 illustrates a diagram of three exemplary blockchains 10, 20, and 30 and how they are stored onto nodes 42, 44, 46, 48, 50, and 52 of a distributed network 40 by a Redundant Array of Independent Blockchain Blocks 6 (RAIBB6) protocol. The RAIBB6 protocol divides the individual blockchains 10, 20, and 30 into separate blocks (i.e. blockchain 10 is striped into blocks 12, 14, 16, and 18; blockchain 20 is striped into blocks 22, 24, 26, and 28; and blockchain 30 is striped into blocks 32, 34, 36, and 38) which are each stored on separate nodes 42, 44, 46, 48, 50, and 52 along with two additional parity blocks 86 and 92, 88 and 94, and 90 and 96 for each blockchain 10, 20, and 30 to provide backup in the event one of the blocks of blockchains 10, 20, and 30 is corrupted or missing. In FIG. 3, distributed network 40 includes an extra node 52 to incorporate a second parity block for each of blockchains 10, 20, and 30. Referring to FIG. 3, the blocks of blockchains 10, 20, and 30 are stored on nodes 42, 44, 46, 48, 50, and 52 and are shown graphically by cylinders 42F, 44F, 46F, 48F, 50F, and 52F. Here, cylinder 42F shows the blockchain blocks stored on node 42. Cylinder 44F shows the blockchain blocks stored on node 44. Cylinder 46F shows the blockchain blocks stored on node 46. Cylinder 48F shows the blockchain blocks stored on node 48. Cylinder 50F shows the blockchain blocks stored on node 50. Cylinder 52F shows the blockchain blocks stored on node 52. Based on the RAIBB6 protocol, node 42 stores blockchain blocks 42F which includes GA block 12, GB block 22, and GC block 32. Node 44 stores blockchain blocks 44F which includes 1A block 14, 1B block 24, and 1C block 34. Node 46 stores blockchain blocks 46F which includes 2A block 16, 2B block 26, and $C_P$ parity block 90. Node 48 stores blockchain blocks 48F which includes 3A block 18, $B_P$ parity block 88, and $C_K$ parity block 96. Node 50 stores blockchain blocks 50F which includes the $A_P$ parity block 86, the $B_K$ parity block 94, and 2C block 36. Node 52 stores blockchain blocks 52F which includes the $A_K$ parity block 92, the 3B block 28, and 3C block 38. With the RAIBB6 protocol, blockchain 10 has two parity blocks which are $A_P$ parity block 86 and $A_K$ parity block 92. Blockchain 20 has two parity blocks which are $B_P$ parity block 88 and $B_K$ parity block 94. Blockchain 30 has two parity blocks which are $C_P$ parity block 90 and $C_K$ parity block 96. With the RAIBB6 protocol, the parity blocks 86, 88, 90, 92, 94, and 96 are distributed across nodes 42, 44, 46, 48, 50, and 52. The P subscript identifies the first parity block. The K subscript identifies the second parity block.

RAIBB6 extends RAIBB5 by adding another parity block. One method of calculating two parity blocks for RAIBB6 involves the use of Reed-Solomon error correcting codes. For the first parity blocks identified by the subscript P, they can be calculated with an XOR of the data blocks as discussed with respect to RAIBB5 in equation 1 shown above. For the second parity blocks identified by the subscript k, they can be calculated by equation 2 shown below through the introduction of a Galois field (where $D_n$ is the $n^{th}$ block of an n-block blockchain).

$$K = \bigoplus_i g^i D_i = g^0 D_0 \oplus g^1 D_1 \oplus g^2 D_2 \oplus \ldots \bigoplus g^{n-1} D_{n-1} \qquad \text{(EQUATION 2)}$$

Figure 4:
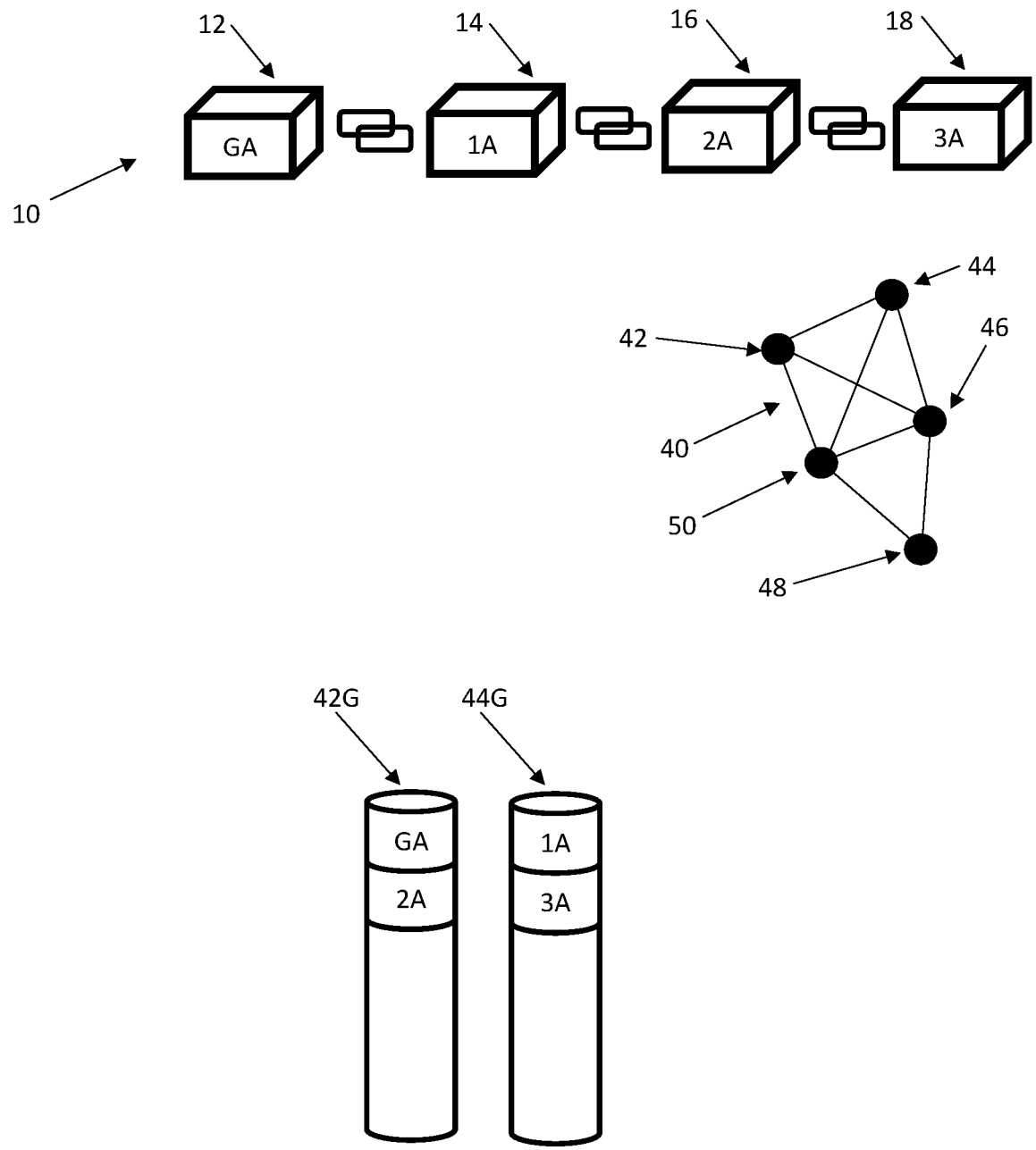
FIG. 4 illustrates a diagram of an exemplary blockchain and how it is stored onto nodes of a distributed network by a Redundant Array of Independent Blockchain Blocks 0 (RAIBB0) protocol by dividing the individual blockchain into separate blocks where the blockchain is striped evenly into individual blocks that are stored across two or more nodes on a distributed network without parity information, redundancy, or fault tolerance.

FIG. 4 illustrates a diagram of an exemplary blockchain 10 and how it is stored onto nodes 42 and 44 of a distributed network 40 by a Redundant Array of Independent Blockchain Blocks 0 (RAIBB0) protocol by dividing the individual blockchain 10 into separate blocks 12, 14, 16, and 18 where the blockchain 10 is striped evenly into individual blocks 12, 14, 16, and 18 that are stored across two or more nodes 42 and 44 on distributed network 40 without parity information, redundancy, or fault tolerance. Here, cylinder 42G shows the blockchain blocks stored on node 42. Cylinder 44G shows the blockchain blocks stored on node 44. Based on the RAIBB0 protocol, node 42 stores blockchain blocks 42G which includes GA block 12 and 2A block 16. Node 44 stores blockchain blocks 44G which includes 1A block 14 and 3A block 18. In FIG. 4, blockchain 10 has the same structure as discussed with respect to the same blockchain in FIG. 1. Blockchain 10 is formed of a Genesis block 12 for the A blockchain and as such is labelled GA. Blockchain 10 includes three other blocks 14, 16, and 18, each of which are respectively labeled 1A, 2A, and 3A identifying them as the first, second and third blocks in the A blockchain 10. Genesis block 12 includes data. This data can include any conceivable form of data such as text, images, video, code, code updates, spreadsheets, biometric-data, metadata, applications, network communication signals, security data, currency, or any other form of electronic data or software. Genesis block 12 also includes a hash of itself. However, as genesis block 12 is the first block in blockchain 10, it does not have a hash of any prior block as that block does not exist. The next block 14 in blockchain 10 is block 1A, labelled as such as being the first block in the A blockchain 10. Block 14 includes data. This data can include any conceivable form of data such as text, images, video, code, code updates, spreadsheets, biometric-data, metadata, applications, network communication signals, security data, currency, or any other form of electronic data or software. Block 14 also includes a hash of genesis block 12 and a hash of itself, thereby linking blocks 12 and 14 together through this chain of hashes. The next block 16 in the A blockchain 10 is block 2A, labelled as such as being the second block in the A blockchain 10. Block 16 includes data. This data can include any conceivable form of data such as text, images, video, code, code updates, spreadsheets, biometric-data, metadata, applications, network communication signals, security data, currency, or any other form of electronic data or software. Block 16 also includes a hash of first block 14 and a hash of itself, thereby linking blocks 16 and 14 together through this chain of hashes. The next block 18 in the A blockchain 10 is block 3A, labelled as such as being the third block in the A blockchain 10. Block 18 includes data. This data can include any conceivable form of data such as text, images, video, code, code updates, spreadsheets, biometric-data, metadata, applications, network communication signals, security data, currency, or any other form of electronic data or software. Block 18 also includes a hash of second block 16 and a hash of itself, thereby linking blocks 18 and 16 together through this chain of hashes.

Figure 5:
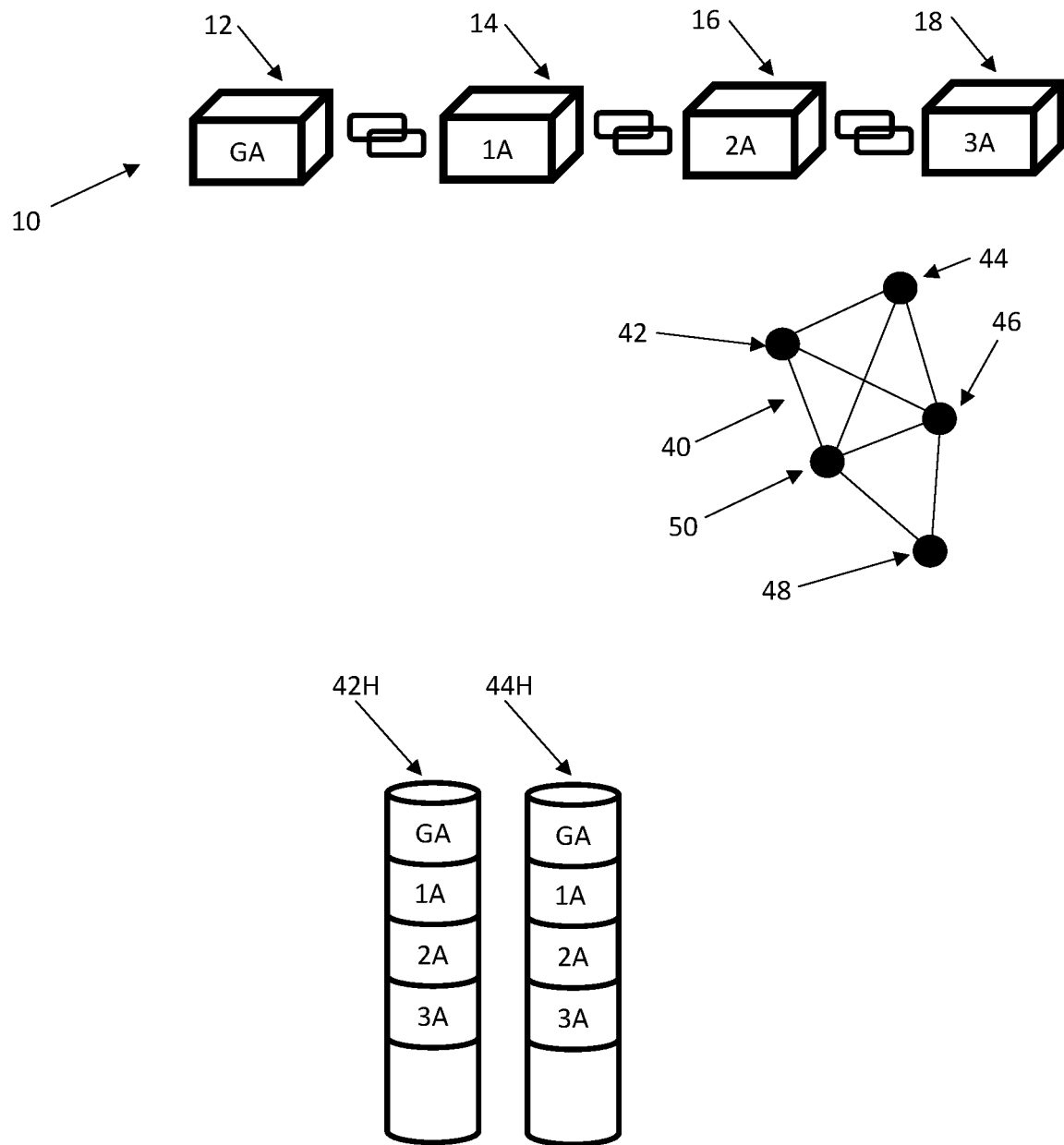
FIG. 5 illustrates a diagram of an exemplary blockchain and how it is stored onto nodes of a distributed network by a Redundant Array of Independent Blockchain Blocks 1 (RAIBB1) protocol by mirroring the entire blockchain onto multiple nodes.

FIG. 5 illustrates a diagram of an exemplary blockchain 10 and how it is stored onto nodes 42 and 44 of distributed network 40 by a Redundant Array of Independent Blockchain Blocks 1 (RAIBB1) protocol by mirroring the entire blockchain 10 onto multiple nodes. Here, cylinder 42H shows the blockchain blocks stored on node 42. Cylinder 44G shows the blockchain blocks stored on node 44. Based on the RAIBB1 protocol, node 42 stores blockchain blocks 42H which includes GA block 12, 1A block 14, 2A block 16, and 3A block 18. Node 44 stores blockchain blocks 44H which includes GA block 12, 1A block 14, 2A block 16, and 3A block 18. In FIG. 4, blockchain 10 has the same structure as discussed with respect to the same blockchain in FIG. 1.

It is contemplated that there may be a Redundant Array of Independent Blockchain Blocks 2 (RAIBB2) protocol by striping the blockchain at the bit-level rather than the blockchain block-level in conjunction with a Hamming code for error correction. It is contemplated that there may also be a Redundant Array of Independent Blockchain Blocks 3 (RAIBB3) protocol by striping the blockchain at the byte-level rather than the blockchain block-level with a dedicated parity node on the distributed network.

Figure 6:
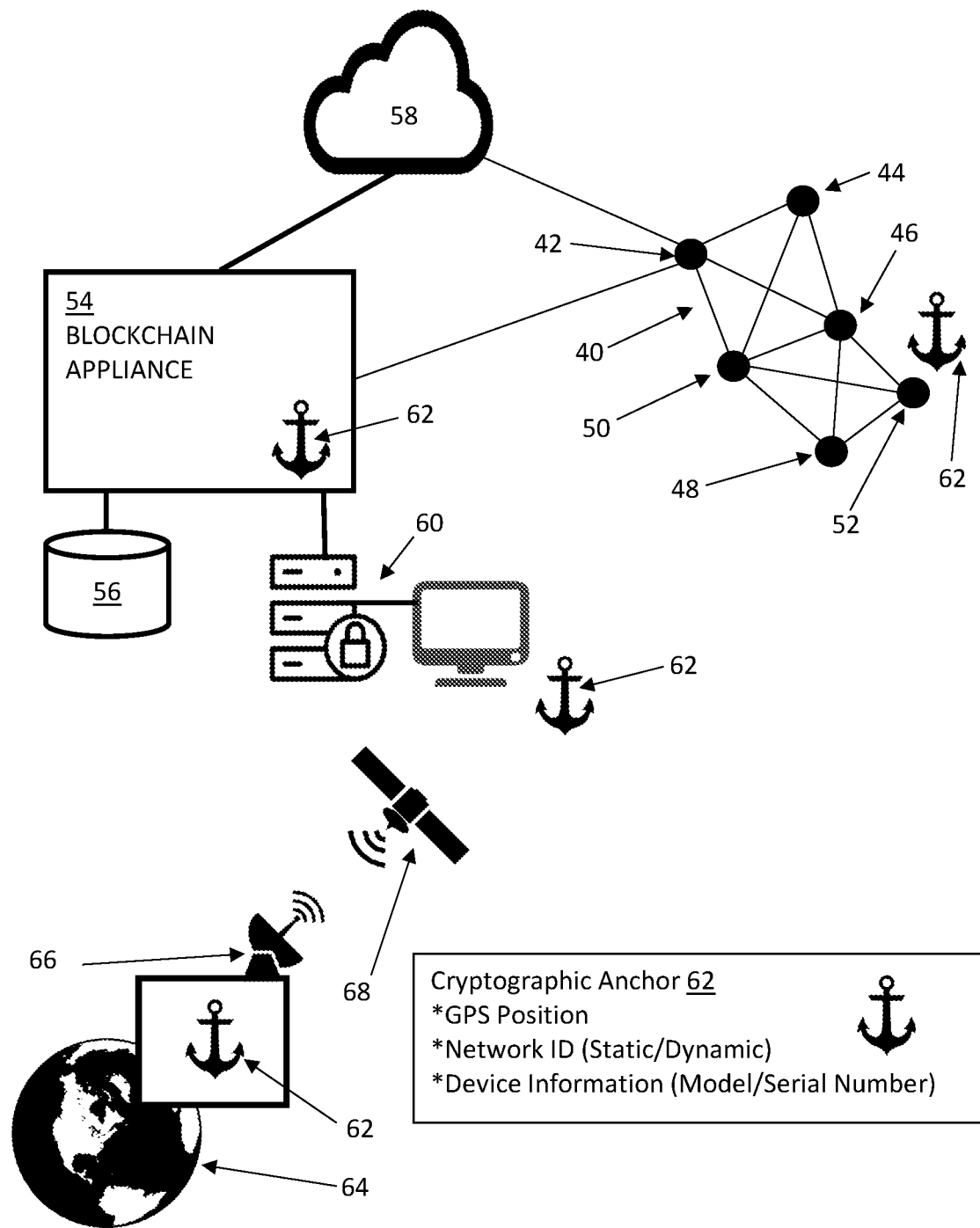
FIG. 6 illustrates a diagram showing a cloud-based blockchain appliance in communication with a terminal/secure server station and a distributed network.

FIG. 6 illustrates a diagram showing a cloud-based blockchain appliance 54 in communication with a terminal/secure server station 60 and a distributed network 40. Cloud-based blockchain appliance 54 is in communication with cloud/internet 58 and has a cloud-based cache data store 56. The use of a cloud-based cache for data store 56 is merely exemplary. Data store 56 may be any type of data store such as a Hard Disk Drive (HDD); a Solid-State Drive (SSD); Electrically-Erasable, Programmable, Read-Only Memory (EEPROM); Random Access Memory (RAM); Compact Disk (CD); Digital Versatile Disk (DVD); Blu-Ray disc (BD); magnetic tape; a cloud; and the like. Terminal/secure server station 60 provides a user with access to the functionality of blockchain appliance 54. Cloud-based blockchain appliance 54 includes a cryptographic anchor 62. Cryptographic anchor 62 provides a secure identity for cloud-based blockchain appliance 54 using a GPS geographic position, a network identity that may be static or dynamic, or device information that may include the model and/or serial number of the hardware device. Terminal/secure server station 60 also includes a cryptographic anchor 62. Cryptographic anchor 62 provides a secure identity for cloud-based blockchain appliance 54 using a GPS geographic position, a network identity that may be static or dynamic, or device information that may include the model and/or serial number of the hardware device. Cryptographic anchor 62 gets a GPS location on Earth 64 through use of a GPS enabled antenna 66 coupled to the cryptographic anchor 62 that is in communication with a constellation of GPS satellites 68. Each node 42, 44, 46, 48, 50, and 52 of distributed network 40 may also include a cryptographic anchor 62. Blockchain Appliance 54 provides the software/hardware implementation of the Redundant Array of Independent Blockchain Blocks (RAIBB) protocols RAIBB0, RAIBB1, RAIBB2, RAIBB3, RAIBB4, RAIBB5, and RAIBB6. Blockchain Appliance 54 supports the creation and extension of blockchains 10, 20, and 30. Blockchain Appliance 54 then stores blockchains 10, 20, and 30 onto nodes 42, 44, 46, 48, 50, and 52 according to protocols RAIBB0, RAIBB1, RAIBB2, RAIBB3, RAIBB4, RAIBB5, and RAIBB6. Blockchain Appliance 54 can then recover blockchains 10, 20, and 30 from being stored on distributed network 40 by retrieving the individual blocks stored on the distributed network 40 according to protocols RAIBB0, RAIBB1, RAIBB2, RAIBB3, RAIBB4, RAIBB5, and RAIBB6 and reconstructing the individual blocks into the complete blockchain 10, 20, and 30. It is contemplated that a blockchain appliance 54 may be accessed by any terminal 60 through cloud 58. Further, it is contemplated that any node 42, 44, 46, 48, 50, and 52 of distributed network 40 may connect with blockchain appliance 54 through cloud 58 and network 40.

Figure 7:
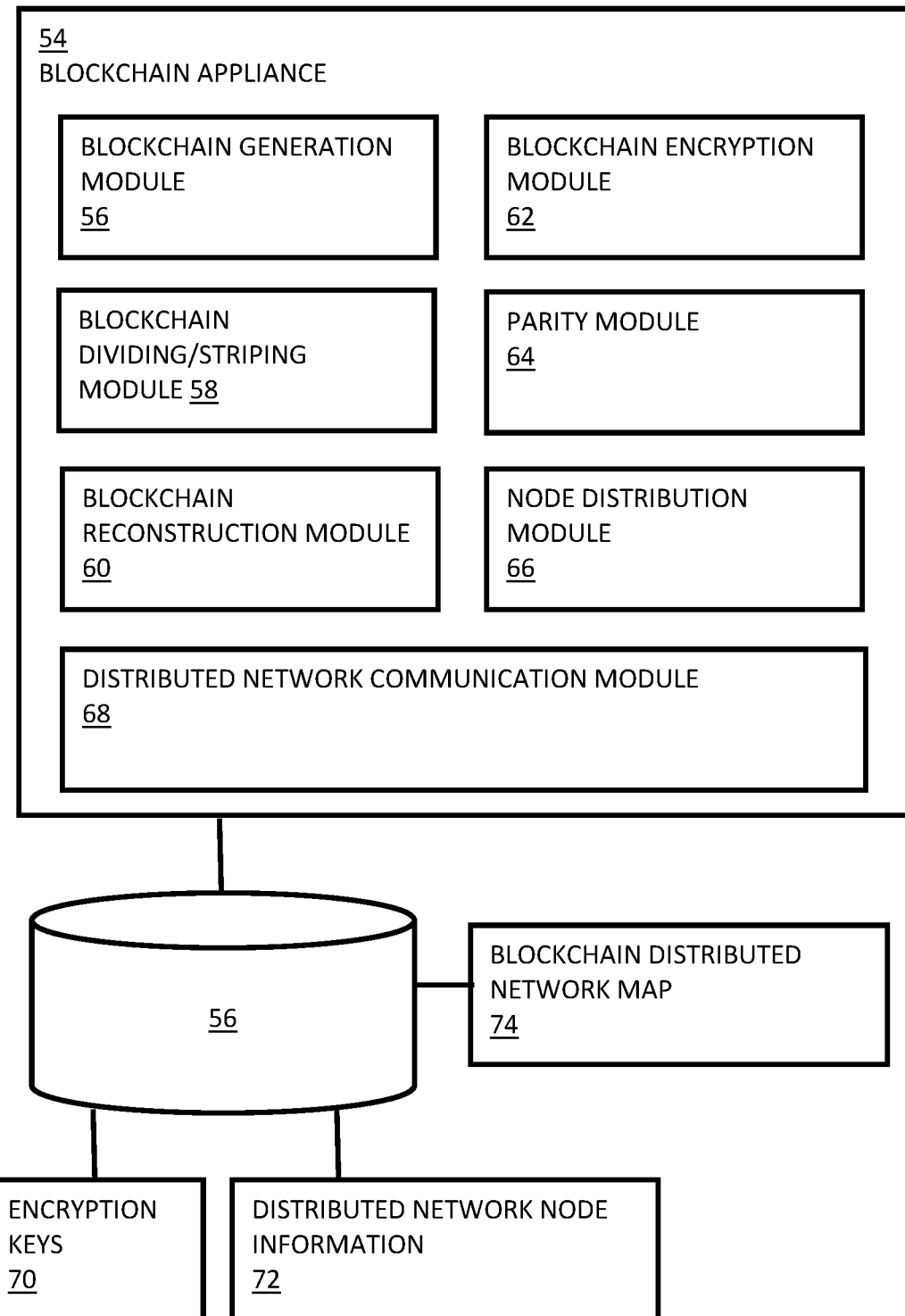
FIG. 7 illustrates a software module diagram detailing all of the functional modules that form the blockchain appliance as well as the data that it stores within a cloud-cache data store.

FIG. 7 illustrates a software module diagram detailing all of the functional modules 56, 58, 60, 62, 64, 66, and 68 that form the blockchain appliance 54 as well as the data 70, 72, and 74 that it stores within a cloud-cache data store 56. Blockchain generation module 56 allows a user through terminal 60 to create a blockchain 10, 20, or 30 through inputting data that forms the data of a block and linking that block to other blocks by computing linking hashes between the blocks. Blockchain generation module 56 also allows a user through terminal 60 to add additional blocks to an existing blockchain through inputting data that forms the data of a block and linking that block to other blocks by computing linking hashes between the blocks. Blockchain dividing/striping module 58 stripes blockchains 10, 20, and 30 into different blocks at the blockchain block-level for the RAIBB0, RAIBB1, RAIBB4, RAIBB5, and RAIBB6 protocols. Blockchain dividing/striping module 58 stripes blockchains 10, 20, and 30 at the bit-level rather than the blockchain block-level in the RAIBB2 protocol. Blockchain dividing/striping module 58 stripes blockchains 10, 20, and 30 at the byte-level rather than the blockchain block-level in the RAIBB3 protocol. Blockchain encryption module 62 may optionally encrypt all striped blocks of blockchains 10, 20, and 30 prior to their being stored onto the nodes of a distributed network 40. Blockchain encryption module 62 uses encryption keys 70 stored on data store 56 to encrypt and decrypt blockchain blocks. When the blockchain blocks are encrypted when they are stored on distributed network 40, blockchain encryption module 62 may also decrypt them in order to reconstruct the blockchain. Blockchain encryption module 62 may also encrypt and decrypt all parity blocks. Parity module 64 generates all of the parity blocks used with RAIBB3, RAIBB4, RAIBB5, and RAIBB6 protocols. Parity is computed by XOR'ing a bit from one block with a bit from another block and storing the result in a parity block. Blockchain appliance 54 also includes a distributed network communication module that allows blockchain appliance 54 to bi-directionally communicate with terminal 60, cloud 58, and every node of distributed network 40. Node distribution module 66 determines which nodes of distributed network 40 are to receive which blockchain blocks striped from a single blockchain along with any parity blocks using distributed network node information 72 stored on data store 56. Distributed network node information 72 is a topographical map of distributed network 40 showing what nodes are in distributed network 40 along with their configuration, which can include cryptographic anchors 62 for each node of the distributed network. Once the node distribution module 66 makes that determination, the node distribution module 66 then stores that information in a blockchain distributed network map 74 on data store 56. Blockchain distributed network map 74 contains all of the data showing which nodes on distributed network 40 store which blocks of blockchain 10, 20, or 30 along with any associated parity blocks, thereby allowing the blockchain appliance 54 to recover and reconstruct the original blockchain 10, 20, or 30 using the blockchain reconstruction module by retrieving all of the stored blocks from distributed network 40 using the distributed network communication module 68.

Figure 8:
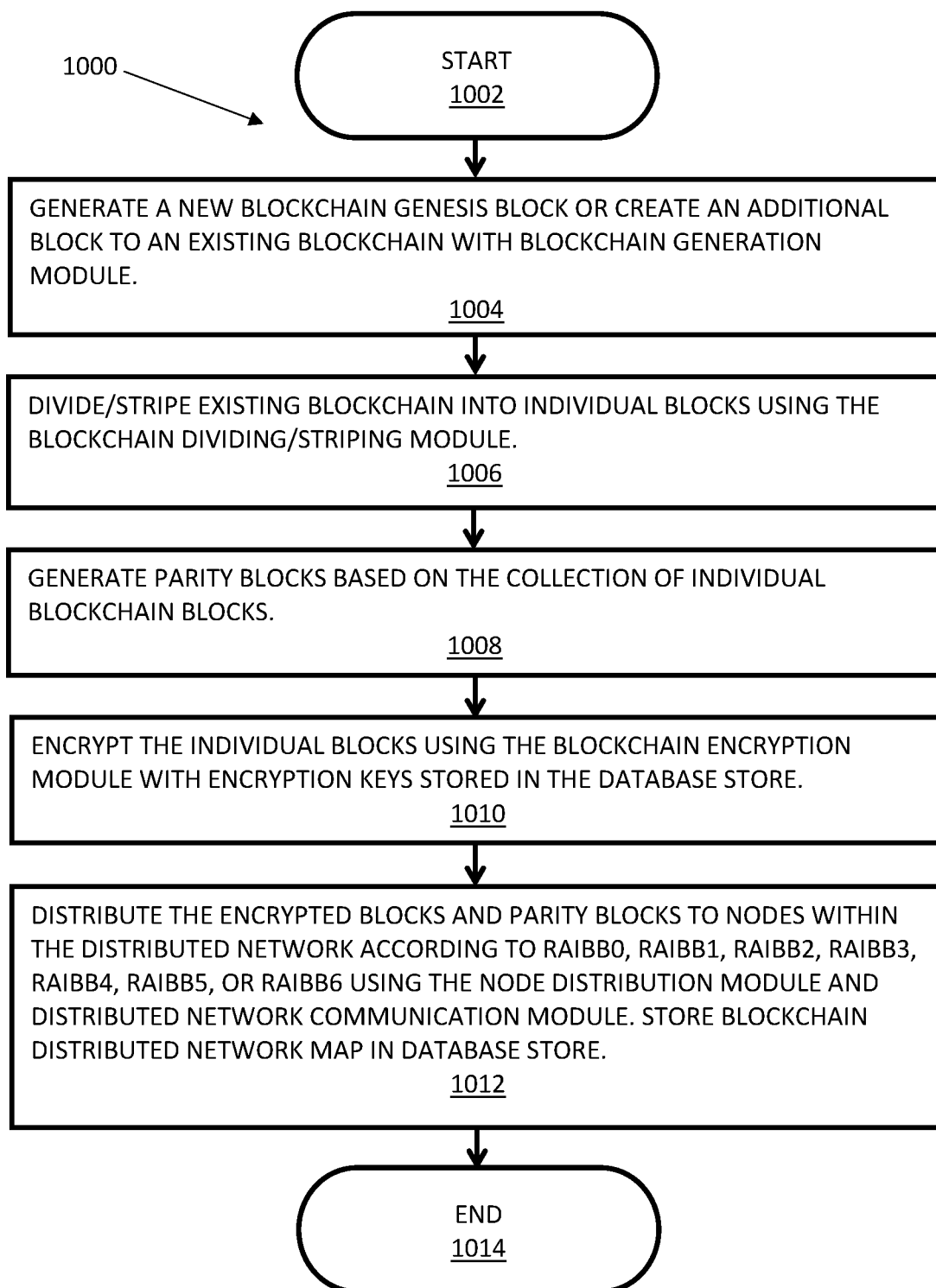
FIG. 8 illustrates a flowchart that depicts a process for generating a single blockchain, dividing it into individual blocks, generating a parity block, separately encrypting each block, and storing it across separate nodes in a distributed network according to a blockchain distributed network map.

FIG. 8 illustrates a flowchart 1000 that depicts a process for generating a single blockchain 10, 20, or 30, dividing it into individual blocks, generating a parity block, separately encrypting each block, and storing it across separate nodes in a distributed network 40 according to a blockchain distributed network map 74. The process begins with START 1002. In step 1004, blockchain generation module 56 generates a new blockchain 10, 20, or 30, or adds a new block or blocks of data to an existing blockchain 10, 20, or 30. In step 1006, the blockchain dividing/striping module 58 divides, or stripes the blockchain 10, 20, or 30 into individual blockchain blocks. In step 1008, parity module 64 computes parity blocks for the striped blockchain using the individual striped blockchain blocks. In step 1010, the blockchain encryption module 62 encrypts the individual blocks and parity blocks with encryption keys 70 stored on data store 56. In step 1012, the encrypted blockchain blocks and parity blocks are assigned for storage onto different nodes of the distributed network by the node distribution module 66 using distributed network node information 72. The assignment for storage of particular blockchain blocks and parity blocks to particular nodes within distributed network 40 is recorded as data within the blockchain distributed network map 74 stored on data store 56. The node distribution module 66 then stores the encrypted blockchain blocks and parity blocks onto the nodes of the distributed network 40 using the distributed network communication module 68. The process then ENDS with step 1014.

Figure 9:
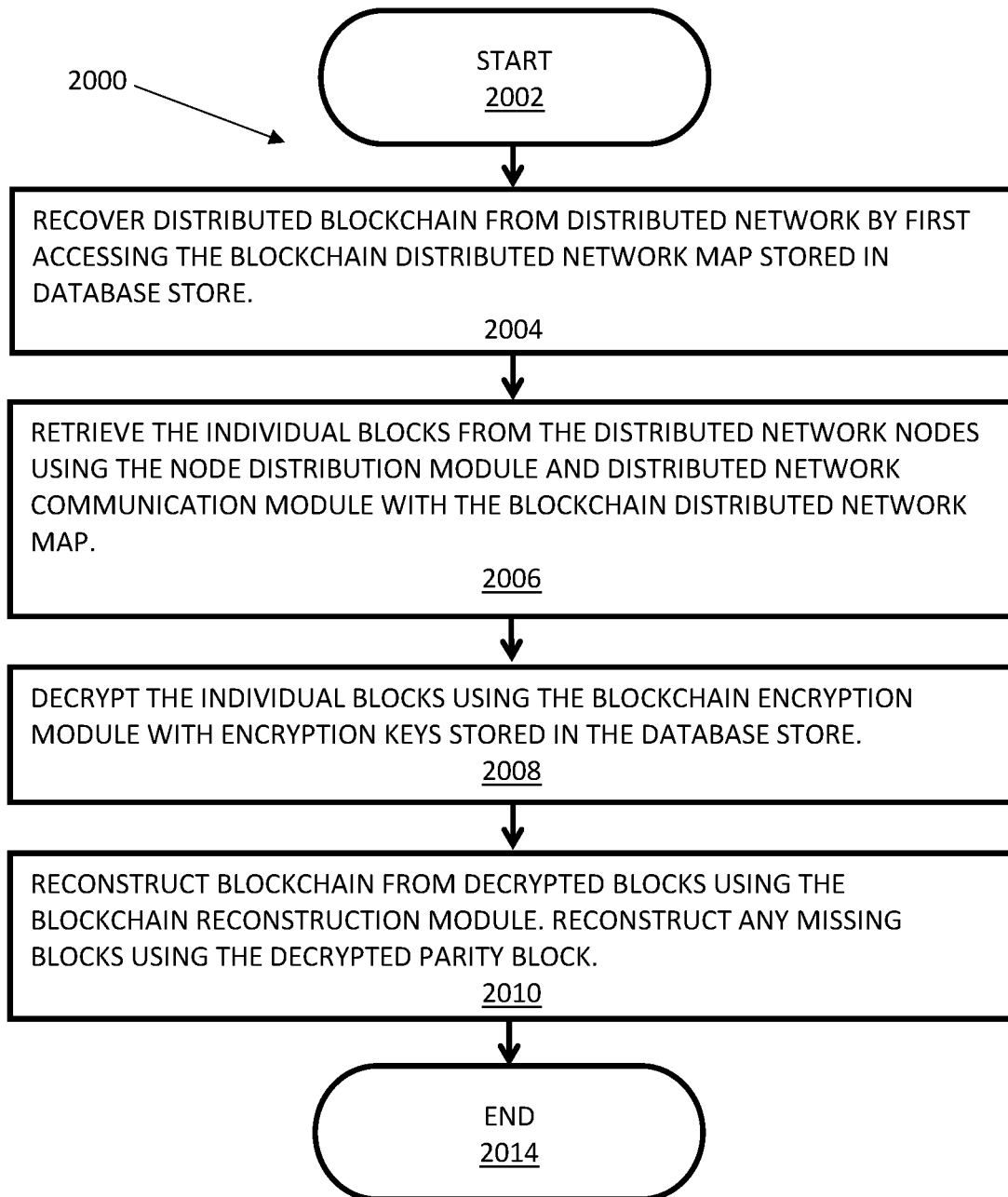
FIG. 9 illustrates a flowchart that depicts a process for recovering a single blockchain from nodes of a distributed network using a blockchain distributed network map and reconstructing the single blockchain from the recovered and decrypted individual blocks.

FIG. 9 illustrates a flowchart 2000 that depicts a process for recovering a single blockchain 10, 20, or 30 from nodes of a distributed network 40 using a blockchain distributed network map 74 and reconstructing the single blockchain 10, 20, or 30 from the recovered and decrypted individual blocks by the blockchain reconstruction module 60. The process begins with START 2002. In step 2004, a blockchain is recovered from storage on the distributed network 40 by first accessing the blockchain distributed network map 74 stored on data store 56. Then in step 2006, all of the individual blockchain blocks and parity blocks stored on the nodes of the distributed network 40 are recovered using the node distribution module 66 in communication with the distributed network communication module 68 using the blockchain distributed network map 72 stored on the data store 56. Next in step 2008, blockchain encryption module 62 uses encryption keys 70 stored on data store 56 to decrypt all of the blockchain blocks and parity blocks. Then in step 2010, the original blockchain 10, 20, or 30 is reconstructed from the recovered and decrypted blockchain blocks and parity blocks recovered from distributed network 40 using the blockchain reconstruction module 60. The process ENDS with step 2014. The code or instructions to execute processes 1000 and 2000 may be stored on a Hard Disk Drive (HDD); a Solid-State Drive (SSD); Electrically-Erasable, Programmable, Read-Only Memory (EEPROM); Random Access Memory (RAM); Compact Disk (CD); Digital Versatile Disk (DVD); Blu-Ray disc (BD); magnetic tape; a cloud; and the like.

Figure 10:
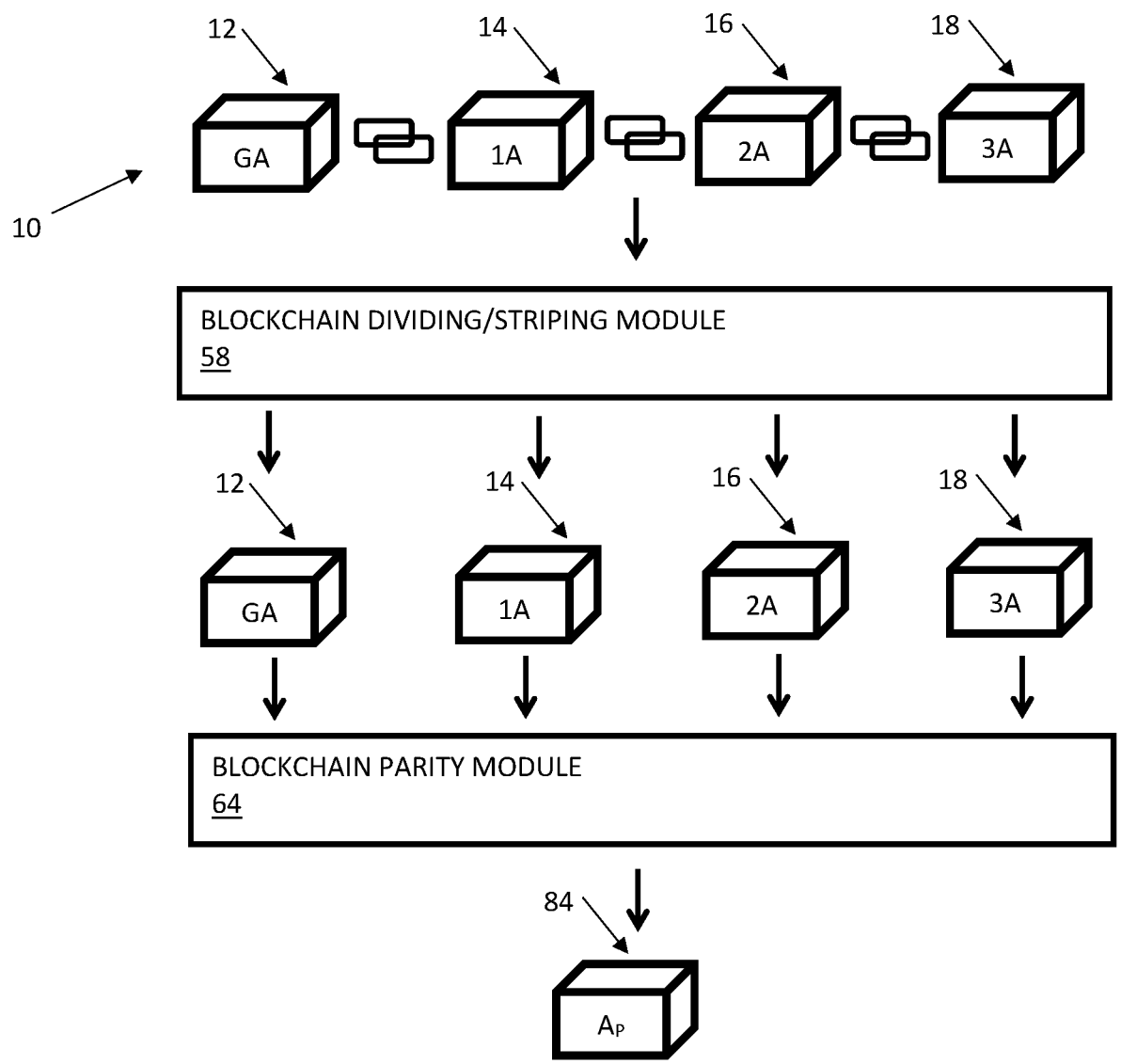
FIG. 10 illustrates a blockchain flow diagram showing the process of creating a parity block from the individual blocks of a blockchain.

FIG. 10 illustrates a blockchain flow diagram showing the process of creating a parity block 84 from the divided/striped individual blocks 12, 14, 16, and 18 of a blockchain 10. The process begins by utilizing blockchain dividing/striping module 58 that separates blockchain 10 formed of blocks 12, 14, 16, and 18 into its separate blocks 12, 14, 16, and 18. Blockchain parity module 64 then performs an XOR process on blocks 12, 14, 16, and 18 to generate parity block 84.

FIG. 11 illustrates a diagram of a blockchain 10 having a genesis block 12 and three succeeding blocks 14, 16, and 18 along with tables showing the linking hashes and data associated with each of the blocks 12, 14, 16, and 18 in the blockchain 10. Blockchain 10 includes three other blocks 14, 16 and 18, each of which are respectively labeled 1A, 2A, and 3A identifying them as the first, second and third blocks in the A blockchain 10. Genesis block 12 includes data. This data can include any conceivable form of data such as text, images, video, code, code updates, spreadsheets, biometric-data, metadata, applications, network communication signals, security data, currency, or any other form of electronic data or software. Genesis block 12 also includes a hash of itself. However, as genesis block 12 is the first block in blockchain 10, it does not have a hash of any prior block as that block does not exist. The next block 14 in blockchain 10 is block 1A, labelled as such as being the first block in the A blockchain 10. Block 14 includes data. This data can include any conceivable form of data such as text, images, video, code, code updates, spreadsheets, biometric-data, metadata, applications, network communication signals, security data, currency, or any other form of electronic data or software. Block 14 also includes a hash of genesis block 12 and a hash of itself, thereby linking blocks 12 and 14 together through this chain of hashes. The next block 16 in the A blockchain 10 is block 2A, labelled as such as being the second block in the A blockchain 10. Block 16 includes data. This data can include any conceivable form of data such as text, images, video, code, code updates, spreadsheets, biometric-data, metadata, applications, network communication signals, security data, currency, or any other form of electronic data or software. Block 16 also includes a hash of first block 14 and a hash of itself, thereby linking blocks 16 and 14 together through this chain of hashes. The next block 18 in the A blockchain 10 is block 3A, labelled as such as being the third block in the A blockchain 10.

Block 18 includes data. This data can include any conceivable form of data such as text, images, video, code, code updates, spreadsheets, biometric-data, metadata, applications, network communication signals, security data, currency, or any other form of electronic data or software. Block 18 also includes a hash of second block 16 and a hash of itself, thereby linking blocks 18 and 16 together through this chain of hashes. The use of blockchain technology helps to protect the integrity of data within blockchain 10 from tampering and manipulation. Blockchains 20 and 30 have similar structures to blockchain 10 as discussed above.

While the invention has been shown and described with reference to a particular embodiment thereof, it will be understood to those skilled in the art, that various changes in form and details may be made therein without departing from the spirit and scope of the invention.

What is claimed is:

1. A distributed network for storing a Redundant Array of Independent Blockchain Blocks (RAIBB), comprising:
   a distributed network containing a plurality of nodes;
   a plurality of blockchains striped into individual constituent blockchain blocks, wherein each individual constituent blockchain block for a single blockchain is separately stored on a different node of the distributed network;
   a plurality of first parity blocks stored on nodes of the distributed network, wherein each first parity block is formed by performing an eXclusive OR (XOR) sum on bits forming the individual constituent blockchain blocks striped from an individual blockchain; and
   a blockchain distributed network map stored in a data store identifying on which nodes of the distributed network all of the individual constituent blockchain blocks and the first parity blocks are stored, thereby allowing for them to be reassembled back into an undivided single blockchain.

2. The distributed network for storing a Redundant Array of Independent Blockchain Blocks (RAIBB) of claim 1, wherein the plurality of blockchains are stored according to a Redundant Array of Independent Blockchain Blocks 4 protocol (RAIBB4) where one node of the distributed network is dedicated to storing all of the first parity blocks only, and as such does not store any of the individual constituent blockchain blocks.

3. The distributed network for storing a Redundant Array of Independent Blockchain Blocks (RAIBB) of claim 1, wherein the plurality of blockchains are stored according to a Redundant Array of Independent Blockchain Blocks 5 protocol (RAIBB5), wherein the plurality of first parity blocks are distributed throughout the nodes of the distributed network along with the individual constituent blockchain blocks from other blockchains, wherein an individual first parity block of the single blockchain is stored on a node of the distributed network separate from the other nodes storing the individual constituent blockchain blocks of the single blockchain, wherein the node storing the individual first parity block may store individual constituent blockchain blocks from other blockchains different from the single blockchain.

4. The distributed network for storing a Redundant Array of Independent Blockchain Blocks (RAIBB) of claim 1, wherein the plurality of blockchains are stored according to a Redundant Array of Independent Blockchain Blocks 6 protocol (RAIBB6) that further comprises a plurality of second parity blocks, wherein an individual second parity block is formed from the individual constituent blockchain blocks striped from the single blockchain, wherein the individual second parity block is stored on a node of the distributed network separate from the other nodes storing the individual constituent blockchain blocks and an individual first parity block for the single blockchain, wherein the node storing the individual second parity block of the single blockchain may also store first parity blocks or individual constituent blockchain blocks from other blockchains different from the single blockchain.

5. The distributed network for storing a Redundant Array of Independent Blockchain Blocks (RAIBB) of claim 4, wherein each second parity block is formed utilizing a Galois field on the individual constituent blockchain blocks striped from the single blockchain.

6. The distributed network for storing a Redundant Array of Independent Blockchain Blocks (RAIBB) of 1, wherein each node within the distributed network includes a cryptographic anchor identifying the node with information selected from a group consisting of GPS positioning information, network identifying information, and device model/serial number information.

7. The distributed network for storing a Redundant Array of Independent Blockchain Blocks (RAIBB) of claim 6, further comprising a cloud-based blockchain appliance accessible by a terminal connected to a node of the distributed network, wherein the cloud-based blockchain appliance comprises:
   a blockchain generation module configured to generate new blockchains, or add new blocks to existing blockchains;
   a blockchain striping module configured to stripe the single blockchain into the individual constituent blockchain blocks; and
   a parity module configured to calculate the plurality of first parity blocks from the individual constituent blockchain blocks forming each blockchain.

8. The distributed network for storing a Redundant Array of Independent Blockchain Blocks (RAIBB) of claim 7, wherein the blockchain appliance further comprises a blockchain encryption module configured to encrypt each individual constituent blockchain block and the plurality of first parity blocks.

9. The distributed network for storing a Redundant Array of Independent Blockchain Blocks (RAIBB) of claim 8, wherein the blockchain encryption module utilizes encryption keys stored in a cloud-cache data store for encrypting each individual constituent blockchain block as well as the plurality of first parity blocks.

10. The distributed network for storing a Redundant Array of Independent Blockchain Blocks (RAIBB) of claim 9, wherein the blockchain appliance further comprises a node distribution module that accesses distributed network node information from the cloud-cache data store, wherein the node distribution module determines which nodes of the distributed network are to store the encrypted individual constituent blockchain blocks and the plurality of first parity blocks.

11. The distributed network for storing a Redundant Array of Independent Blockchain Blocks (RAIBB) of claim 10, wherein the node distribution module generates the blockchain distributed network map to record where each encrypted individual constituent blockchain block is stored on the distributed network as well as which node stores the first parity blocks.

12. The distributed network for storing a Redundant Array of Independent Blockchain Blocks (RAIBB) of claim 11, wherein the blockchain appliance further comprises a distributed network communications module, wherein the node distribution module transmits the encrypted individual constituent blockchain blocks and the first parity blocks to the specific nodes of the distributed network according to the blockchain distributed network map through the distributed network communication module.

13. The distributed network for storing a Redundant Array of Independent Blockchain Blocks (RAIBB) of claim 12, wherein the blockchain appliance further comprises a blockchain reconstruction module, wherein the blockchain reconstruction module gathers the encrypted individual constituent blockchain blocks from the nodes of the distributed network using the blockchain distributed network map, wherein the blockchain reconstruction module uses the blockchain encryption module to decrypt the encrypted individual constituent blockchain blocks and reconstructs the single blockchain from them using the blockchain distributed network map.

14. The distributed network for storing a Redundant Array of Independent Blockchain Blocks (RAIBB) of claim 13, wherein the blockchain reconstruction module uses the first parity blocks to reconstruct the single blockchain in the event any individual constituent blockchain block is corrupted or missing.

15. A non-transitory computer readable medium containing instructions for storing a blockchain on a distributed network according to a Redundant Array of Independent Blockchain Blocks protocol (RAIBB), comprising the steps of:
   striping a blockchain into individual constituent blockchain blocks;
   generating a first parity block from the individual constituent blockchain blocks, wherein the first parity block is formed by performing an eXclusive OR (XOR) sum on the bits forming the individual constituent blockchain blocks striped from the blockchain;
   storing each of the individual constituent blockchain blocks and the first parity block on separate nodes in a distributed network; and
   generating a blockchain distributed network map identifying where all of the individual constituent blockchain blocks and the first parity block are stored on the distributed network allowing for all of the individual constituent blockchain blocks and the first parity block to be reassembled back into a single blockchain.

16. The non-transitory computer readable medium containing instructions for storing a blockchain on a distributed network according to a Redundant Array of Independent Blockchain Blocks protocol (RAIBB) of claim 15, further comprising the steps of:
   recovering the individual constituent blockchain blocks and the first parity block from the nodes of the distributed network;
   utilizing the first parity block for recreating any individual constituent blockchain blocks that are missing or corrupted; and
   reassembling the individual constituent blockchain blocks into an undivided blockchain.

17. The non-transitory computer readable medium containing instructions for storing a blockchain on a distributed network according to a Redundant Array of Independent Blockchain Blocks protocol (RAIBB) of claim 16, wherein the blockchain is stored according to a Redundant Array of Independent Blockchain Blocks 4 protocol (RAIBB4) where one node of the distributed network is dedicated to storing parity blocks only, wherein the first parity block is stored on that node.

18. The non-transitory computer readable medium containing instructions for storing a blockchain on a distributed network according to a Redundant Array of Independent Blockchain Blocks protocol (RAIBB) of claim 16, wherein the blockchain is stored according to a Redundant Array of Independent Blockchain Blocks 5 protocol (RAIBB5), wherein the node storing the first parity block may also store individual constituent blockchain blocks from other blockchains.

19. The non-transitory computer readable medium containing instructions for storing a blockchain on a distributed network according to a Redundant Array of Independent Blockchain Blocks protocol (RAIBB) of claim 16, wherein the blockchain is stored according to a Redundant Array of Independent Blockchain Blocks 6 protocol (RAIBB6) that further comprises a second parity block formed utilizing a Galois field on the individual constituent blockchain blocks striped from the blockchain, wherein the second parity block is stored on a node of the distributed network separate from the other nodes storing the individual constituent blockchain blocks and the first parity block, wherein the node storing the second parity block may also store first parity blocks or individual constituent blockchain blocks from other blockchains.

\* \* \* \* \*